(12) United States Patent
Cho et al.

(10) Patent No.: US 9,318,732 B2
(45) Date of Patent: Apr. 19, 2016

(54) LITHIUM RECHARGEABLE BATTERY

(75) Inventors: Sung Jae Cho, Yongin-si (KR); Sang sok Jung, Yongin-si (KR); Shin Gun Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 263 days.

(21) Appl. No.: 13/493,416

(22) Filed: Jun. 11, 2012

(65) Prior Publication Data

US 2012/0244424 A1     Sep. 27, 2012

Related U.S. Application Data

(63) Continuation of application No. 11/232,868, filed on Sep. 23, 2005, now Pat. No. 8,216,705.

(30) Foreign Application Priority Data

Sep. 24, 2004 (KR) .................. 10-2004-0077227
Oct. 28, 2004 (KR) .................. 10-2004-0086893

(51) Int. Cl.
*H01M 2/04* (2006.01)
*H01M 2/12* (2006.01)
*H01M 2/02* (2006.01)
(Continued)

(52) U.S. Cl.
CPC .......... *H01M 2/1241* (2013.01); *H01M 2/0207* (2013.01); *H01M 2/0404* (2013.01); *H01M 2/263* (2013.01); *H01M 2/30* (2013.01); *Y10T 29/49108* (2015.01)

(58) Field of Classification Search
CPC ............ H01M 2/0207; H01M 2/0404; H01M 2/1241; H01M 2/22; H01M 2/263; H01M 2/30; Y10T 29/49108
USPC .......................... 429/53–56, 72–89, 163–186
See application file for complete search history.

(56) References Cited

U.S. PATENT DOCUMENTS 6,190,798 B1 *  2/2001  Okada et al. .................. 429/163
6,228,523 B1     5/2001  Azema
(Continued)

FOREIGN PATENT DOCUMENTS

JP     2002-334685     11/2002
JP     2004-103579     4/2004
(Continued)

OTHER PUBLICATIONS

Non-Final Office Action of U.S. Appl. No. 11/232,868, dated Nov. 13, 2009.
Final Office Action of U.S. Appl. No. 11/232,868, dated Jun. 24, 2010.
(Continued)

*Primary Examiner* — Milton I Cano
*Assistant Examiner* — Stephen Yanchuk
(74) *Attorney, Agent, or Firm* — H.C. Park & Associates, PLC

(57) ABSTRACT

A lithium rechargeable battery in which an anti-rotation groove is integrally formed with a lower recess of a safety vent at a lower surface of a cap plate, and an insulating plate and a terminal plate rest in the anti-rotation groove so that the terminal plate is prevented from rotating when a cap assembly is assembled is provided. In addition, instead of the anti-rotation groove, a resting recess is formed on a lower surface of the cap plate, and the insulating plate and the terminal plate rest in the resting recess, so that the terminal plate is prevented from rotating when the cap assembly is assembled.

19 Claims, 13 Drawing Sheets

(51) Int. Cl.
*H01M 2/26* (2006.01)
*H01M 2/30* (2006.01)

(56) References Cited

U.S. PATENT DOCUMENTS

| | | |
|---|---|---|
| 2001/0004505 A1 | 6/2001 | Kim et al. |
| 2003/0118899 A1* | 6/2003 | Kometani et al. ............. 429/161 |
| 2003/0194609 A1* | 10/2003 | Nam et al. ................... 429/181 |
| 2004/0137322 A1* | 7/2004 | Hong et al. .................. 429/176 |

FOREIGN PATENT DOCUMENTS

| | | |
|---|---|---|
| KR | 10-2001-0039431 | 5/2001 |
| KR | 10-2003-0066243 | 8/2003 |

OTHER PUBLICATIONS

Non-Final Office Action of U.S. Appl. No. 11/232,868, dated Feb. 9, 2011.
Final Office Action of U.S. Appl. No. 11/232,868, dated Aug. 5, 2011.
Notice of Allowance of U.S. Appl. No. 11/232,868, dated Mar. 22, 2012.

* cited by examiner

LITHIUM RECHARGEABLE BATTERY

CROSS REFERENCE TO RELATED APPLICATIONS

This application is a continuation of U.S. patent application No. 11/232,868, filed on Sep. 23, 2005, now U.S. Pat. No. 8,216,705 and claims priority to and the benefit of Korean Patent Application No. 10-2004-0077227, filed on Sep. 24, 2004 and Korean Patent Application No. 10-2004-0086893, filed on Oct. 28, 2004 which are hereby incorporated by reference for all purposes as if fully set forth herein.

BACKGROUND OF THE INVENTION

1. Field of the Invention

The present invention relates to a lithium rechargeable battery. In particular, the present invention relates to a lithium rechargeable battery in which an anti-rotation groove is integrally formed with a lower recess of a safety vent at a lower surface of a cap plate. In addition, an insulating plate and a terminal plate rest in the anti-rotation groove so that the terminal plate is prevented from rotating when a cap assembly is assembled. The present invention also relates to a lithium rechargeable battery, in which a resting recess is formed on a lower surface of a cap plate, and an insulating plate and a terminal plate rest in the resting recess so that the terminal plate can be prevented from rotating when a cap assembly is assembled.

2. Description of the Background

Recently, portable wireless devices such as video cameras, portable phones, and portable computers that are compact and lightweight and are equipped with various functions have been developed. Studies have been actively performed on rechargeable batteries that are used as power sources for the portable wireless devices. For example, the rechargeable batteries include Ni-Cd batteries, Ni-MH batteries, Ni-Zn batteries and lithium rechargeable batteries.

Lithium rechargeable batteries may be fabricated in a compact size and have a high operating voltage and high energy density per unit weight, which makes them suitable for use in the advanced electronic technology fields.

FIG. 1a is an exploded perspective view of a conventional lithium rechargeable battery and FIG. 1b is a sectional view of a cap plate included in the conventional lithium rechargeable battery.

The lithium rechargeable battery may be obtained by accommodating an electrode assembly 112 including a second electrode plate 113, a first electrode plate 115 and a separator 114 in a can 110 together with an electrolyte, and then sealing an upper opening 110a of the can 110 using a cap assembly 120. In general, the first electrode plate 115 may be a negative electrode plate and the second electrode plate 113 may be a positive electrode plate.

The cap assembly 120 includes a cap plate 140, an insulating plate 150, a terminal plate 160 and an electrode terminal 130. The cap assembly 120 is housed in an insulating case 170 and assembled with the upper opening 110a of the can 110, thereby sealing the can 110.

The cap plate 140 comprises a metal plate with a size and a shape that corresponds to the upper opening 110a of the can 110. The cap plate 140 is positioned towards the top of the cap assembly 120 with a first terminal hole 141 that has a predetermined size and the electrode terminal 130 is inserted into the first terminal hole 141. When the electrode terminal 130 is inserted into the first terminal hole 141, a gasket tube 149 is provided around the electrode terminal 130 to insulate the electrode terminal 130 from the cap plate 140. A safety vent 146 is formed at one side of the cap plate 140 and an electrolyte injection hole 142 with a predetermined size is formed at the other side of the cap plate 140. After the cap assembly 120 has been assembled with the upper opening 110a of the can, the electrolyte is injected into the can 110 through the electrolyte injection hole 142. Then, the electrolyte injection hole 142 is sealed with a plug 143.

Referring to FIG. 1b, the safety vent 146 includes an upper recess 148 formed on an upper surface of the cap plate 140 and a lower recess 147 formed on a lower surface of the cap plate 140. The safety vent 146 breaks when the internal pressure of the rechargeable battery increases due to over-charge, over-discharge, or overheating of the rechargeable battery so that gas contained in the rechargeable battery can be exhausted to the exterior through the safety vent 146, thereby preventing explosion of the rechargeable battery. The position of the safety vent 146 in the rechargeable battery may vary depending on the type of battery.

The electrode terminal 130 is coupled with a first electrode tab 117 of the first electrode plate 115 or a second electrode tab 116 of the second electrode plate 113 so that the electrode terminal 130 may serve as a negative electrode terminal or a positive electrode terminal.

The insulating plate 150 may comprise substantially the same insulating material as the gasket and is coupled with the lower surface of the cap plate 140. The insulating plate 150 is formed with a second terminal hole 151, which is aligned with the first terminal hole 141 of the cap plate 140 and into which the electrode terminal 130 is inserted. The insulating plate 150 is positioned on the lower surface of the cap plate 140 with a resting recess 152 with a size and a shape that corresponds to the terminal plate 160 such that the terminal plate 160 may rest in the resting recess 152.

The terminal plate 160 may comprise a Ni alloy and is coupled with the lower surface of the insulating plate 150. The terminal plate 160 is formed with a third terminal hole 161, which is aligned with the first terminal hole 141 of the cap plate 140 and into which the electrode terminal 130 is inserted. Since the electrode terminal 130 inserted into the first terminal hole 141 of the cap plate 140 is insulated from the terminal plate 140 by the gasket tube 149, the terminal plate 160 may be electrically connected to the electrode terminal 130 while being electrically insulated from the cap plate 140.

In order to couple the electrode terminal 130 with the cap plate 140, the insulating plate 150, and the terminal plate 160, the electrode terminal 130 is inserted into the first terminal hole 141 of the cap plate 140 by applying predetermined pressure and rotational force to the electrode terminal 130. Thus, the electrode terminal 130 is coupled with the terminal plate 160 by passing through the first, second and third terminal holes 141, 151 and 161, respectively. Thus, the insulating plate 150 and the terminal plate 160 may rotate about the first terminal hole 141 of the cap plate 140 while the electrode terminal 130 is being inserted into the first, second and third terminal holes 141, 151 and 161, so the insulating plate 150 may be offset from the terminal plate 160.

In addition, when the positive electrode tab 116 is coupled with the lower surface of the terminal plate 160, the terminal plate 160 may rotate so that the terminal plate 160 may be offset from its initial position.

Furthermore, when a lead plate (not shown) connected to a protective circuit module is coupled with the electrode terminal 130 after the cap assembly 120 has been assembled, the terminal plate 160 may rotate together with the electrode terminal 130 so that the terminal plate 160 may be damaged.

In addition, in order to couple the cap assembly 120 with the insulating case 170, the insulating plate 150 and the terminal plate 160 must be reverse-rotated about the electrode terminal 130 such that they are aligned in the same direction as the cap plate 140. However, such a process not only lengthens the process time, but also causes deformation of the terminal plate 160 made from a thin metal plate.

SUMMARY OF THE INVENTION

The present invention provides a lithium rechargeable battery in which an anti-rotation groove is integrally formed with a lower recess of a safety vent at a lower surface of a cap plate, and an insulating plate and a terminal plate rest in the anti-rotation groove, so that the terminal plate can be prevented from rotating when a cap assembly is assembled.

The present invention also provides a lithium rechargeable battery in which a resting recess is formed on a lower surface of a cap plate, and an insulating plate and a terminal plate rest in the resting recess, so that the terminal plate can be prevented from rotating when a cap assembly is assembled.

Additional features of the invention will be set forth in the description which follows, and in part will be apparent from the description, or may be learned by practice of the invention.

The present invention discloses a lithium rechargeable battery comprising an electrode assembly including a first electrode plate, a second electrode plate and a separator, and a can that houses the electrode assembly and an electrolyte. The electrode assembly includes a cap plate, an insulating plate, a terminal plate, and an electrode terminal. The cap plate is positioned at an upper opening of the can in order to seal the can and includes a safety vent formed at a first side of the cap plate and an anti-rotation groove that is integrally formed with a lower recess of the safety vent at a lower surface of the first side of the cap plate.

The present invention also discloses a lithium rechargeable battery comprising an electrode assembly including a positive electrode plate, a negative electrode plate and a separator and a can that houses the electrode assembly and an electrolyte. The electrode assembly includes a cap plate, an insulating plate, a terminal plate and an electrode terminal. The cap plate is positioned at an upper opening of the can in order to seal the can, and includes a first resting recess with a substantially similar size as the insulating plate such that the insulating plate rests in the first resting recess.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3b is a sectional view taken along line A-A' shown in FIG. 3a.

FIG. 4b is a sectional view taken along line B-B' shown in FIG. 4a.

FIG. 5b is a sectional view taken along line C-C' shown in FIG. 5a.

FIG. 9a is a bottom view of a cap assembly including a cap plate shown in FIG. 3a, an insulating plate shown in FIG. 4a and a terminal plate shown in FIG. 5a.

FIG. 9b is a sectional view taken along line D-D' shown in FIG. 9a.

FIG. 13b is a sectional view taken along line A-A' shown in FIG. 13a.

FIG. 14b is a sectional view taken along line B-B' shown in FIG. 14a.

FIG. 18a is a bottom view of a cap assembly including a cap plate shown in FIG. 13a and an insulating plate shown in FIG. 14a.

FIG. 18b is a sectional view taken along line C-C' shown in FIG. 18a.

DETAILED DESCRIPTION OF THE ILLUSTRATED EMBODIMENTS

Figure 1A:
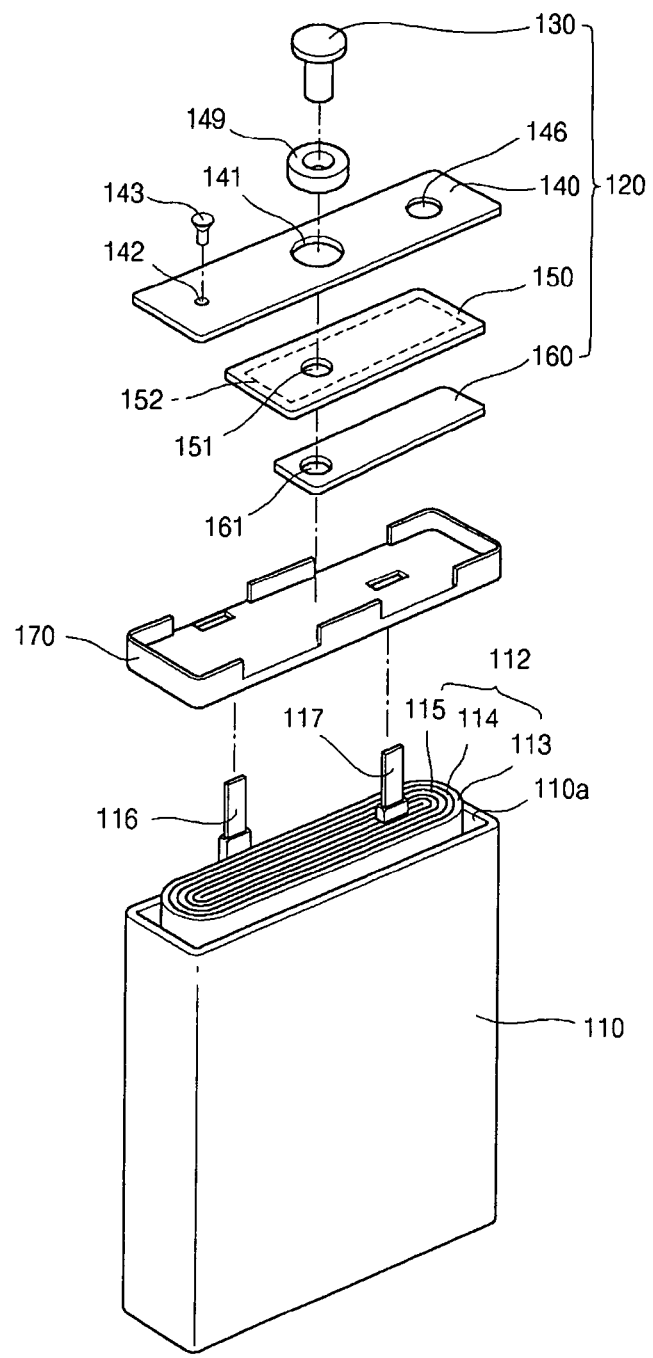
FIG. 1a is an exploded perspective view of a conventional lithium rechargeable battery.
Figure 1B:
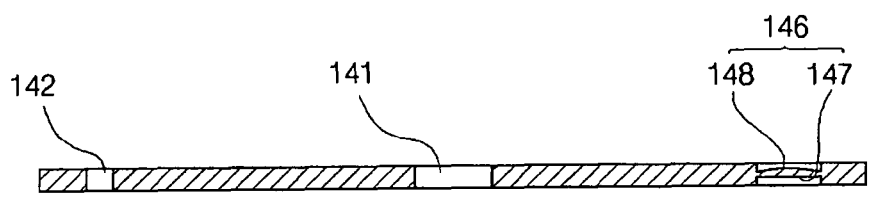
FIG. 1b is a sectional view of a cap plate included in a conventional lithium rechargeable battery.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
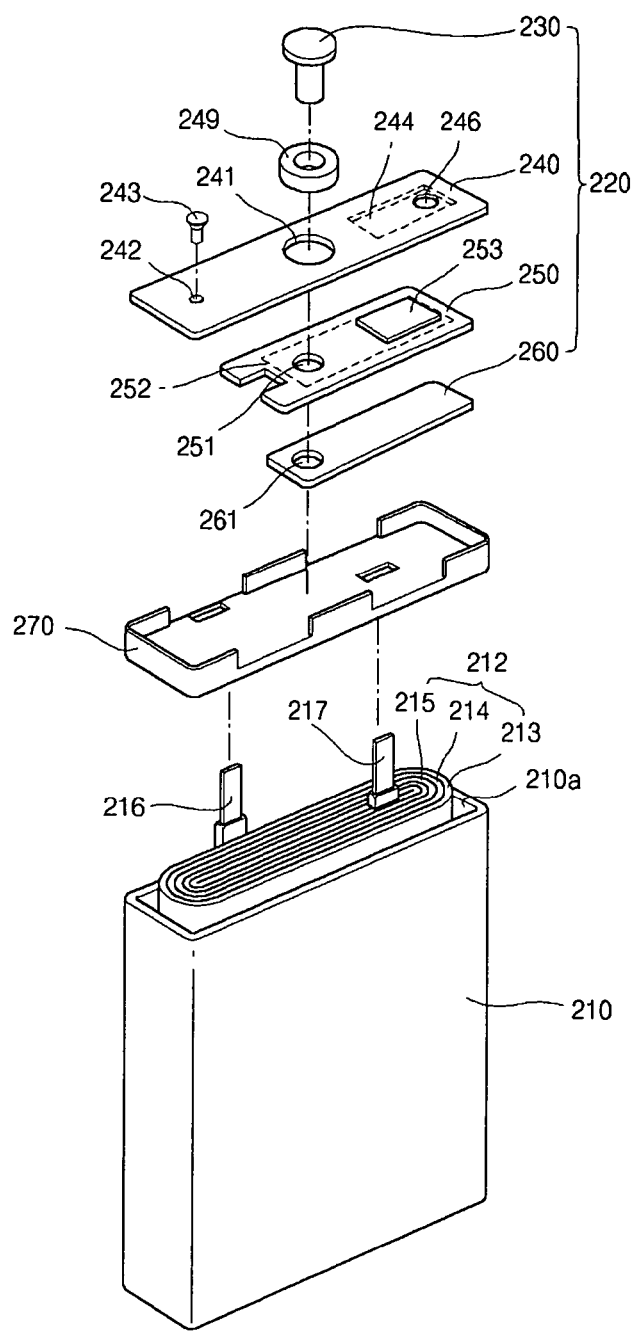
FIG. 2 is an exploded perspective view of a lithium rechargeable battery according to an exemplary embodiment of the present invention.
Figure 3A:
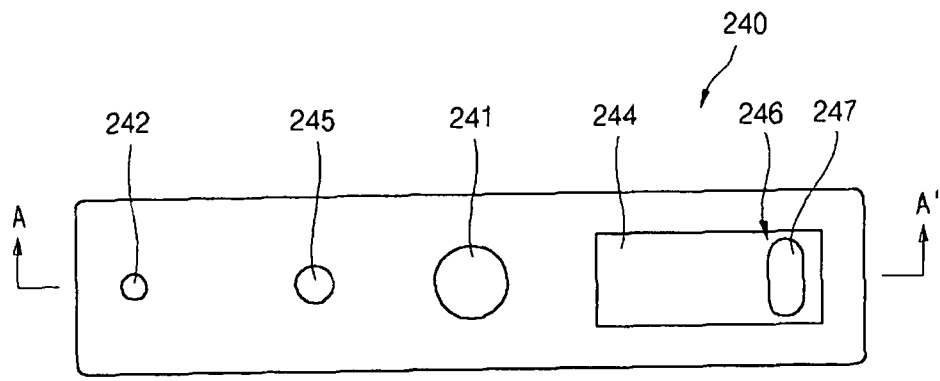
FIG. 3a is a bottom view of the cap plate shown in FIG. 2.
Figure 3B:
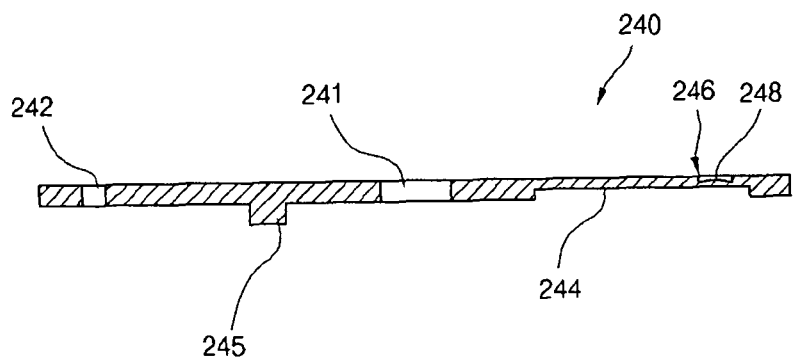
Figure 4A:
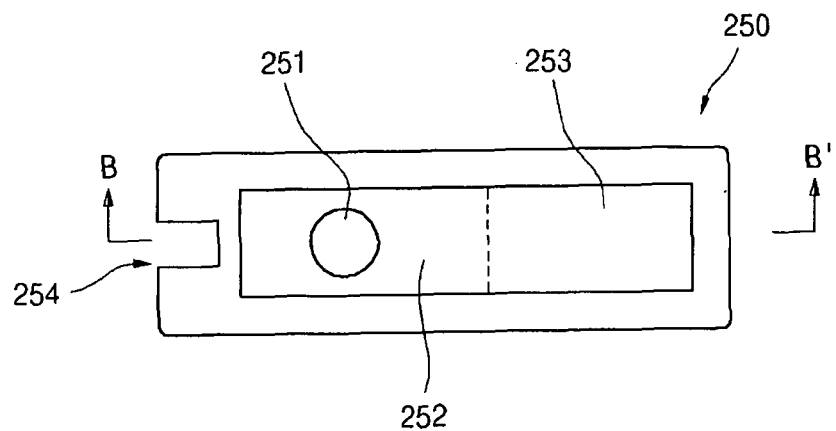
FIG. 4a is a bottom view of the insulating plate shown in FIG. 2.
Figure 4B:
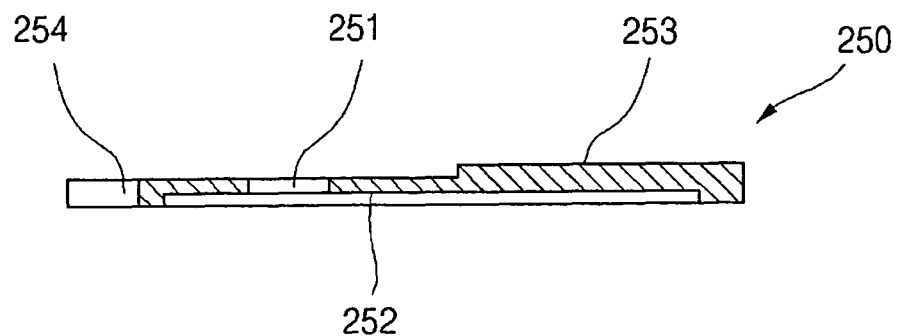
Figure 5A:
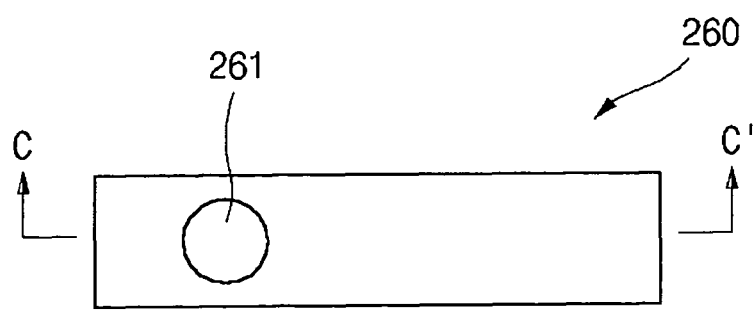
FIG. 5a is a plan view of the terminal plate shown in FIG. 2.
Figure 5B:

FIG. 2 is an exploded perspective view of a lithium rechargeable battery according to an exemplary embodiment of the present invention, FIG. 3a is a bottom view of a cap plate shown in FIG. 2, FIG. 3b is a sectional view taken along line A-A' shown in FIG. 3a, FIG. 4a is a bottom view of an insulating plate shown in FIG. 2, FIG. 4b is a sectional view taken along line B-B' shown in FIG. 4a, FIG. 5a is a plan view of a terminal plate shown in FIG. 2, and FIG. 5b is a sectional view taken along line C-C' shown in FIG. 5a.

Referring to FIG. 2, the lithium rechargeable battery of the present invention includes a can 210, an electrode assembly 212 housed in the can 210, and a cap assembly 220 assembled with an upper end portion of the can 210 in order to seal an upper opening 210a of the can 210.

The can 210 comprises a metal and has a box shape. For example, the can 210 may comprise lightweight aluminum or an aluminum alloy. The can 210 has an upper end with the upper opening 210a, and the electrode assembly 212 is housed in the can 210 through the upper opening 210a.

The electrode assembly 212 includes a second electrode plate 213, a first electrode plate 215, and a separator 214. The first electrode plate 215 and the second electrode plate 213 are stacked with the separator 214 interposed therebetween and are then wound in the shape of a jellyroll. A second electrode tab 216 is coupled with the second electrode plate 213 and an end portion of the second electrode tab 216 protrudes upward from the electrode assembly 212. A first electrode tab 217 is coupled with the first electrode plate 215 and an end portion of the first electrode tab 217 protrudes upward from the electrode assembly 212. In general, the first electrode plate 215 serves as a negative electrode plate, the first electrode tab 217 serves as a negative electrode tab, the second electrode plate 213 serves as a positive electrode plate, and the second electrode tab 216 serves as a positive electrode tab. However, it is also possible to form the first electrode plate and the first electrode tab as the positive electrode plate and the positive electrode tab, respectively, while forming the second electrode plate and the second electrode tab as the negative electrode plate and the negative electrode tab, respectively.

The cap assembly 220 includes a cap plate 240, an insulating plate 250, a terminal plate 260, and an electrode terminal 230. The cap assembly 220 is housed in an insulating case 270 and is coupled with the upper opening 210a of the can 210 to seal the can 210.

Referring to FIG. 3a and FIG. 3b, the cap plate 240 may comprise a metal plate with a size and shape corresponding to the upper opening 210a of the can 210. The cap plate 240 is formed at the center of the upper opening 210a with a fourth terminal hole 241 having a predetermined size and the electrode terminal 230 is inserted into the fourth terminal hole 241. A gasket tube 249 is provided in the fourth terminal hole 241 to insulate the electrode terminal 230 from the cap plate 240.

A safety vent 246 is formed at one side of the cap plate 240 and an anti-rotation groove 244 is formed on a lower surface of the cap plate 240 corresponding to the safety vent 246. The safety vent 246 includes an upper recess 248 formed on the upper surface of the cap plate 240 and a lower recess 247 formed on the lower surface of the cap plate 240. The safety is vent 246 is broken when internal pressure of the rechargeable battery rises due to over-charge, over-discharge or over-heating of the rechargeable battery so that gas contained in the rechargeable battery may be exhausted to the exterior through the safety vent 246, thereby preventing explosion of the battery. A coupling tip 245 may also be formed at the other side of the cap plate 240.

The anti-rotation groove 244 is integrally formed with the lower recess 247 of the safety vent 246 and extends from the lower recess 247 of the safety vent 246 towards the fourth terminal hole 241 by a predetermined distance. The anti-rotation groove 244 may be formed together with the lower recess 247 of the safety vent 246 by recessing the lower surface of the cap plate 240. Therefore, the anti-rotation groove 244 may be formed when forming the safety vent 246, thus eliminating an additional process to form the anti-rotation groove 244.

The anti-rotation groove 244 may be formed with various shapes, such as a square shape, a rectangular shape, or a cylindrical shape, but is not limited thereto. The anti-rotation groove 244 has a length corresponding to about 10% to about 40% of a length of the cap plate 240 and a width corresponding to at least about 40% of a width of the cap plate 240. If the length or the width of the anti-rotation groove 244 is too small, the anti-rotation groove 244 cannot securely fix the terminal plate 260. In contrast, if the length or the width of the anti-rotation groove 244 is too large, the thickness of the cap plate 240 is reduced, so the strength of the cap plate 240 may be weakened.

The depth of the anti-rotation groove 244 is selected by taking a contact surface between the cap plate 240 and the insulating plate 250 into consideration. For example, the anti-rotation groove 244 may be about 0.1 mm to about 0.3 mm deep. If the anti-rotation groove 244 is less than about 0.1 mm deep, the anti-rotation groove 244 cannot secure the insulating plate 250. In addition, if the anti-rotation groove 244 is more than about 0.3 mm deep, strength of the cap plate 240 may be weakened.

The electrolyte injection hole 242 is formed at the other side of the cap plate 240 with a predetermined size. After the cap assembly 220 has been coupled with the upper opening 210a of the can 210, the electrolyte is injected into the can 210 through the electrolyte injection hole 242. Then, the electrolyte injection hole 242 is sealed with a plug 243.

The coupling tip 245 protrudes from a predetermined position between the fourth terminal hole 241 and the electrolyte injection hole 242 by a predetermined height. The height of the coupling tip 245 may be equal to or less than that of the insulating plate 250 such that the coupling tip 245 may not protrude out of the insulating plate 250 when the insulating plate 250 is coupled with the coupling tip 245. The coupling tip 245 may be omitted if rotation of the insulating plate 250 is prevented by the anti-rotation groove 244.

Referring to FIG. 4a and FIG. 4b, the insulating plate 250 may comprise substantially the same insulating material as that of the gasket and is coupled with the lower surface of the cap plate 240. The insulating plate 250 includes a second terminal hole 251, a resting recess 252, a protrusion 253, and a coupling slot 254.

The fifth terminal hole 251 is aligned corresponding to the fourth terminal hole 241 of the cap plate 240 when the insulating plate 250 is coupled with the cap plate 240 such that the electrode terminal 230 may be inserted into the fifth terminal hole 251 through the first terminal hole 241.

The resting recess 252 is formed on the lower surface of the insulating plate 250 with a size and a shape that corresponds to the terminal plate 260. The resting recess 252 may have a depth less than the thickness of the terminal plate 260.

The protrusion 253 protrudes from one side of the upper surface of the insulating plate 250 by a predetermined height such that the protrusion 253 may be coupled with the anti-rotation groove 244. If the height or the size of the protrusion 253 is larger than the depth or the size of the anti-rotation groove 244, the protrusion 253 may be incompletely coupled with the anti-rotation groove 244 so that the insulating plate 250 cannot be secured. In addition, if the height or the size of the protrusion 253 is much smaller than the depth or the size of the anti-rotation groove 244, the protrusion 253 may be insufficiently coupled with the anti-rotation groove 244, so that the insulating plate 250 cannot be secured. In this case, the insulating plate 250 and the terminal plate 260 may rotate idly.

The coupling slot 254 is formed at the other side of the insulating plate 250 corresponding to the coupling tip 245 provided at the lower surface of the cap plate 240 such that the coupling tip 245 may be inserted into the coupling slot 254. If the coupling slot 254 of the insulating plate 250 is coupled with the coupling tip 245 of the cap plate 240, the insulating plate 250 and the terminal plate 260 may be prevented from rotating relative to the cap plate 240 when the electrode terminal 230 is inserted into the fifth terminal hole 251. The coupling slot 254 may be omitted if the coupling tip 245 is not provided in the cap plate 240.

The terminal plate 260 may comprise a plate-shaped Ni alloy, but is not limited thereto. The terminal plate 260 rests in the resting recess 252 formed on the lower surface of the insulating plate 250 and is secured with the insulating plate 250. The terminal plate 260 includes a sixth terminal hole 261, which is aligned corresponding to the fourth terminal hole 241 of the cap plate 240 and into which the electrode terminal 230 is inserted. The terminal plate 260 is coupled with the electrode terminal 230 while being electrically insulated from the cap plate 240 by means of the insulating plate 250.

The electrode terminal 230 is inserted into the fourth, fifth and sixth terminal holes 241, 251 and 261 formed in the cap plate 240, the insulating plate 250 and the terminal plate 260, respectively. In addition, the electrode terminal 230 is coupled with the first electrode tab 217 of the electrode assembly 212 through the terminal plate 260. When the electrode terminal 230 is inserted into the fourth terminal hole 241 of the cap plate 240, the electrode terminal 230 is electrically insulated from the cap plate 240 by the gasket tube 249. It is also possible to allow the electrode terminal 230 to be coupled with the second electrode tab 216 depending on the type of the electrode assembly 212.

Figure 6:
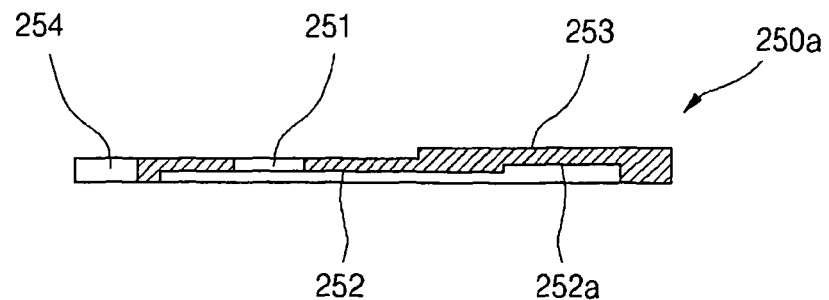
FIG. 6 is a sectional view of an insulating plate according to another exemplary embodiment of the present invention.
Figure 7:
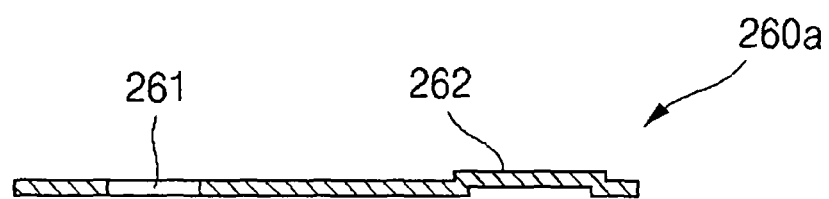
FIG. 7 is a sectional view of a terminal plate according to another exemplary embodiment of the present invention.

FIG. 6 is a sectional view of an insulating plate according to another exemplary embodiment of the present invention, and FIG. 7 is a sectional view of a terminal plate according to another exemplary embodiment of the present invention.

Referring to FIG. 6, the insulating plate 250a includes a protrusion 253 at its upper surface and a resting recess 252 at its lower surface. A fixing groove 252a is formed at a predetermined portion of the resting recess 252. The fixing groove 252a may be aligned with the protrusion 253 of the insulating plate 250a and is substantially the same size as the protrusion 253 of the insulating plate 250a.

Referring to FIG. 7, the terminal plate 260a includes an anti-rotation protrusion 262 at its upper surface. The anti-rotation protrusion 262 corresponds to the fixing groove 252a formed on the lower surface of the insulating plate 250a. Thus, the anti-rotation protrusion 262 is coupled with the fixing groove 252a, thereby preventing the terminal plate 260a from rotating relative to the insulating plate 250a.

Figure 8:
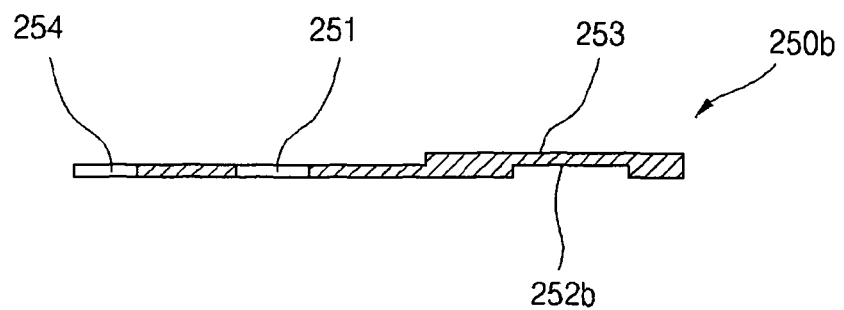
FIG. 8 is a sectional view of an insulating plate according to another exemplary embodiment of the present invention.

FIG. 8 is a sectional view of an insulating plate according to another exemplary embodiment of the present invention.

Referring to FIG. 8, the insulating plate 250b includes a fixing groove 252b on its lower surface without forming a separate resting recess and includes a protrusion 253 on its upper surface. The fixing groove 252b has a size and a shape that corresponds to an anti-rotation groove 244 of the cap plate 240 and is coupled with the anti-rotation protrusion 262 of the terminal plate 260a shown in FIG. 7. Accordingly, the terminal plate 260a is fixed to the insulating plate 250b that rests in the anti-rotation groove 244 of the cap plate 240 so that the terminal plate 260a may be prevented from rotating relative to the cap plate 240.

Hereinafter, the operation of the cap assembly included in the lithium rechargeable battery according to the present invention will be described.

Figure 9A:
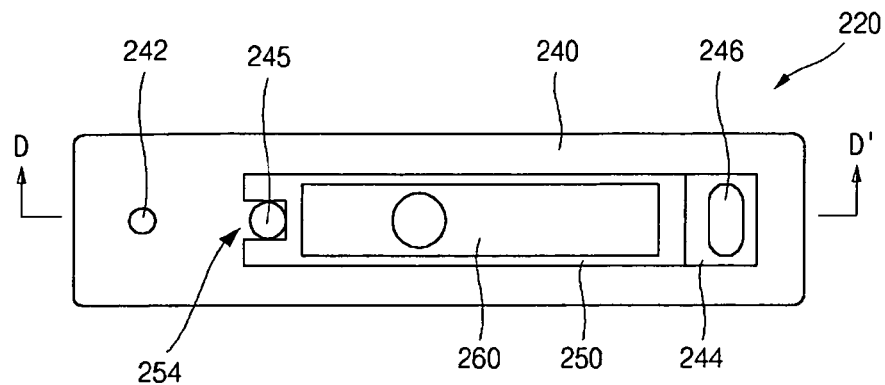
Figure 9B:
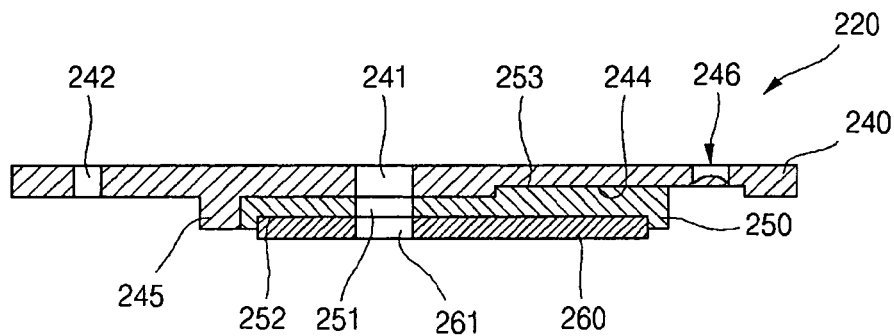

FIG. 9a is a bottom view of the cap assembly including the cap plate shown in FIG. 3a, the insulating plate shown in FIG. 4a and the terminal plate shown in FIG. 5a, and FIG. 9b is a sectional view taken along line D-D' shown in FIG. 9a.

Referring to FIG. 9a and FIG. 9b, the cap plate 240, the insulating plate 250, and the terminal plate 260 of the cap assembly 220 are stacked such that centers of the fourth, fifth and sixth terminal holes 241, 251 and 261 match each other. The electrode terminal 230 is then inserted into the first, second and third terminal holes 241, 251 and 261. The protrusion 253 provided on the upper surface of the insulating plate 250 is coupled with the anti-rotation groove 244 formed on the lower surface of the cap plate 240.

In addition, the terminal plate 260 rests in the resting recess 252 formed on the lower surface of the insulating plate 250. At this time, the safety vent 246 that is integrally formed with the anti-rotation groove 244 is exposed without being covered by the insulating plate 250 so that the safety vent 246 can perform its own functions. The coupling tip 245 formed at the other side of the cap plate 240 is inserted into the coupling slot 254 of the insulating plate 250.

The electrode terminal 230 is inserted into the fourth terminal hole 241 of the cap plate 240 stacked as shown in FIG. 9a while being rotated by predetermined external force applied thereto and sequentially passes through the second and third terminal holes 251 and 261, respectively. When the electrode terminal 230 is sequentially inserted into the fourth, fifth and sixth terminal holes 241, 251 and 261, friction may occur between the electrode terminal 230 and fifth and sixth terminal holes 251 and 261 of the insulating plate 250 and the terminal plate 260, respectively. Thus, the insulating plate 250 and the terminal plate 260 may rotate about the fourth terminal hole 241 of the cap plate 240. However, since the protrusion 253 of the insulating plate 250 is coupled with the anti-rotation groove 244 of the cap plate 240 and the terminal plate 260 rests in the resting recess 252 of the insulating plate 250, the insulating plate 250 and the terminal plate 260 are prevented from rotating about the fourth terminal hole 241 of the cap plate 240. In addition, since the coupling tip 245 of the cap plate 240 is inserted into the coupling slot 254 of the insulating plate 250, the rotation of the insulating plate 250 may be further prevented.

In addition, when a lead plate (not shown) is coupled with the electrode terminal 230 after the cap assembly 220 has been assembled, the electrode terminal 230 may be prevented from rotating. Even if the electrode terminal 230 rotates, the terminal plate 260 can be prevented from rotating.

Figure 10:
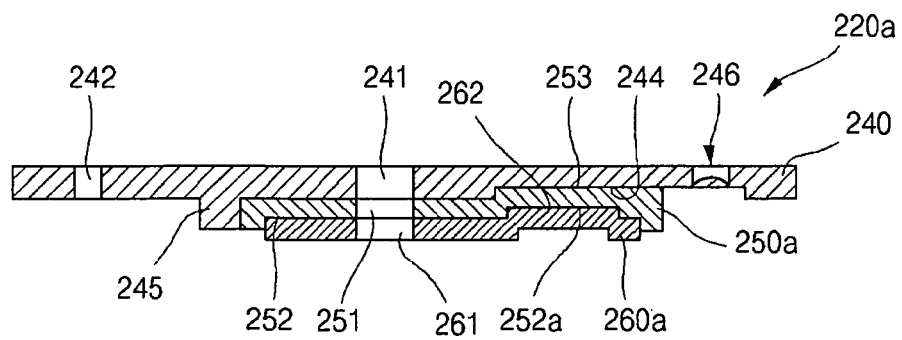
FIG. 10 is a sectional view of a cap assembly including a cap plate shown in FIG. 3a, an insulating plate shown in FIG. 6 and a terminal plate shown in FIG. 7.

FIG. 10 is a sectional view of the cap assembly including the cap plate shown in FIG. 3a, the insulating plate shown in FIG. 6, and the terminal plate shown in FIG. 7.

Referring to FIG. 10, the cap plate 240, the insulating plate 250a and the terminal plate 260a of the cap assembly 220a are stacked such that centers of the fourth, fifth and sixth terminal holes 241, 251 and 261 match each other and the electrode terminal 230 is fixedly inserted into fourth, fifth and sixth terminal holes 241, 251 and 261. At this time, the protrusion 253 formed on the upper surface of the insulating plate 250a is coupled with the anti-rotation groove 244 formed on the lower surface of the cap plate 240. In addition, the terminal plate 260a rests in the resting recess 252 formed on the lower surface of the insulating plate 250a. The fixing groove 252a is formed in the resting recess 252 of the insulating plate 250a and the anti-rotation protrusion 262 formed on the upper surface of the terminal plate 260a is inserted into the fixing groove 252a. Therefore, the insulating plate 250a and the terminal plate 260a may not rotate relative to the cap plate 240 when the electrode terminal 230 is inserted into the fourth, fifth and sixth terminal holes 241, 251 and 261.

Figure 11:
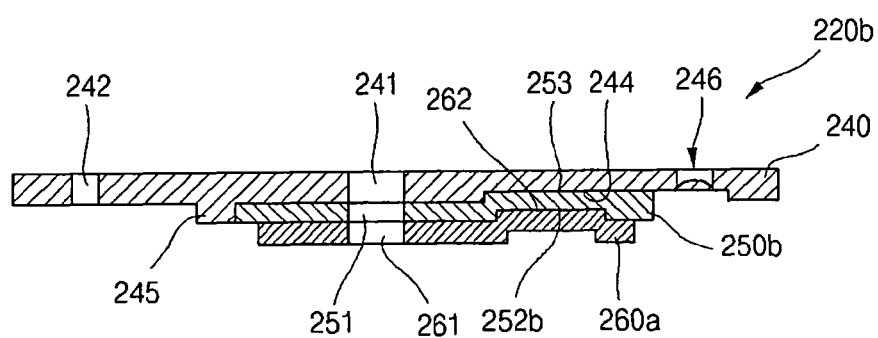
FIG. 11 is a sectional view of a cap assembly including a cap plate shown in FIG. 3a, an insulating plate shown in FIG. 8 and a terminal plate shown in FIG. 7.

FIG. 11 is a sectional view of the cap assembly including the cap plate shown in FIG. 3a, the insulating plate shown in FIG. 8, and the terminal plate shown in FIG. 7.

Referring to FIG. 11, the cap plate 240, the insulating plate 250b, and the terminal plate 260a of the cap assembly 220b are stacked such that centers of the fourth, fifth and sixth terminal holes 241, 251 and 261 match each other and the electrode terminal 230 is fixedly inserted into the fourth, fifth and sixth terminal holes 241, 251 and 261. At this time, the protrusion 253 formed on the upper surface of the insulating plate 250b is coupled with the anti-rotation groove 244 formed on the lower surface of the cap plate 240. In addition, the terminal plate 260a rests on the lower surface of the insulating plate 250b. The anti-rotation protrusion 262 formed on the upper surface of the terminal plate 260a is inserted into the fixing groove 252b formed on the lower surface of the insulating plate 250b. Therefore, the insulating plate 250b and the terminal plate 260a may not rotate relative to the cap plate 240 when the electrode terminal 230 is inserted into the first, second and third terminal holes 241, 251 and 261.

Figure 12:
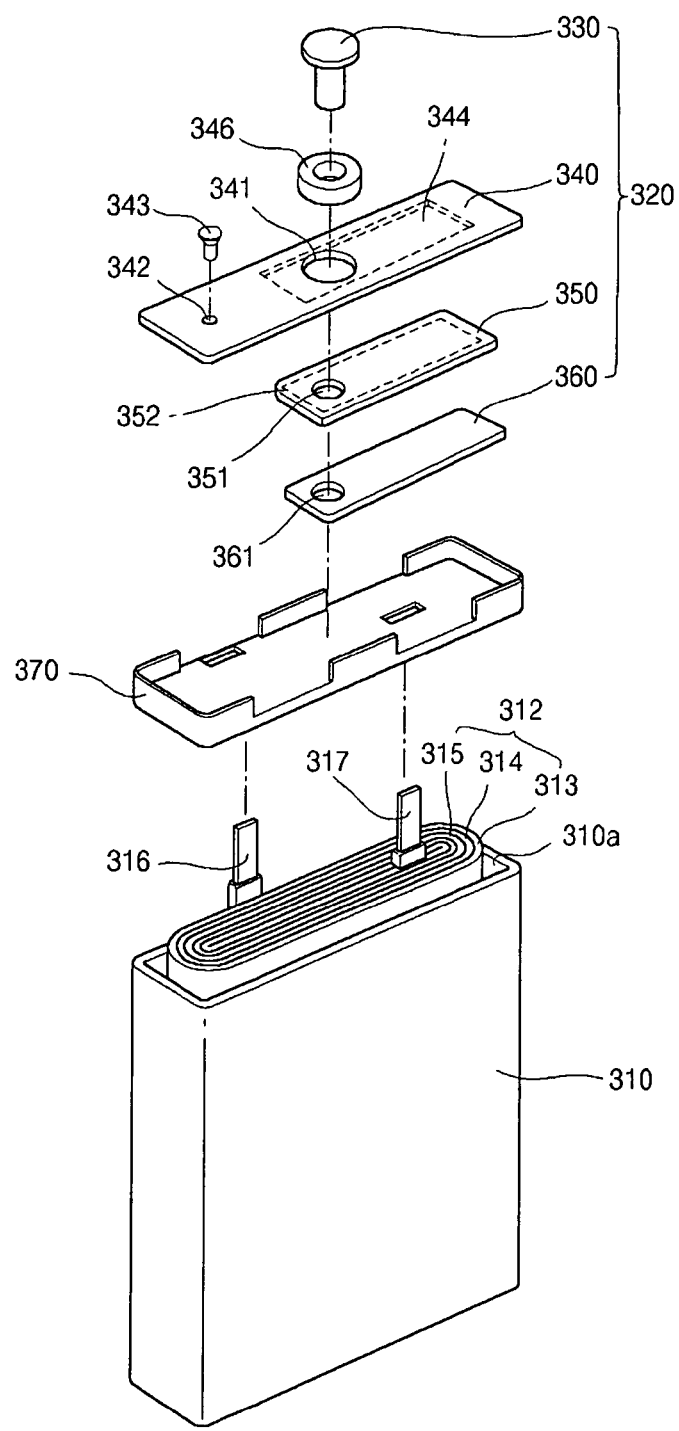
FIG. 12 is an exploded perspective view of a lithium rechargeable battery according to another exemplary embodiment of the present invention.
Figure 13A:
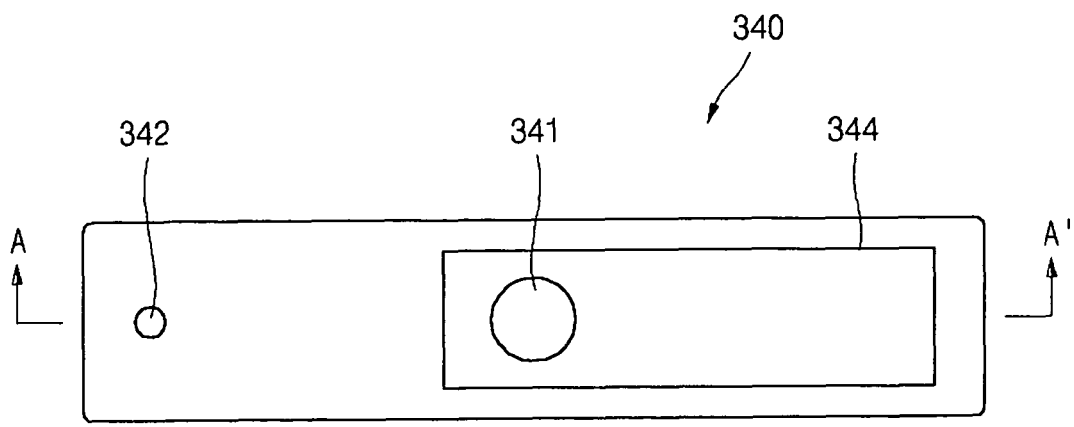
FIG. 13a is a bottom view of a cap plate shown in FIG. 12.
Figure 13B:
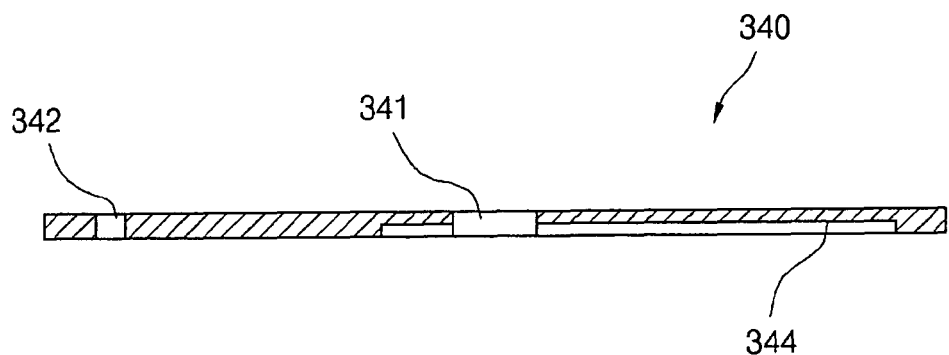
Figure 14A:
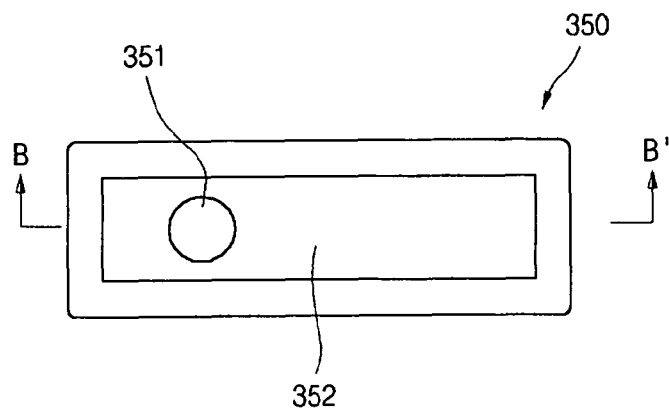
FIG. 14a is a bottom view of an insulating plate shown in FIG. 12.
Figure 14B:
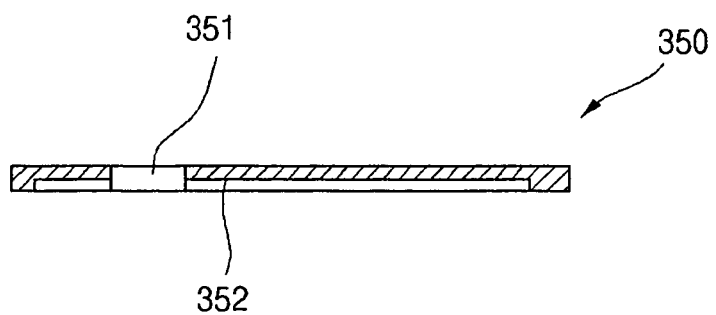

FIG. 12 is an exploded perspective view of a lithium rechargeable battery according to another exemplary embodiment of the present invention, FIG. 13a is a bottom view of a cap plate shown in FIG. 12, FIG. 13b is a sectional view taken along line A-A' shown in FIG. 13a, FIG. 14a is a bottom view of an insulating plate shown in FIG. 12, and FIG. 14b is a sectional view taken along line B-B' shown in FIG. 14a.

Referring to FIG. 12, the lithium rechargeable battery according to another exemplary embodiment of the present invention includes a can 310, an electrode assembly 312 accommodated in the can 310, and a cap assembly 320 assembled with an upper end portion of the can 310 in order to seal an upper opening 310a of the can 310.

The can 310 may comprise a metal with a box shape. The can 310 may comprise lightweight aluminum or an aluminum alloy. The can 310 includes an upper opening 310a at an upper end and the electrode assembly 312 is housed in the can 310 through the upper opening 310a.

The electrode assembly 312 includes a positive electrode plate 313, a negative electrode plate 315 and a separator 314. The positive electrode plate 313 and the negative electrode plate 315 are stacked with the separator 314 therebetween and then wound in the form of a jellyroll. A positive electrode tab 316 is welded to the positive electrode plate 313 and an end portion of the positive electrode tab 316 protrudes upward from the electrode assembly 312. A negative electrode tab 317 is welded to the negative electrode plate 315 and an end portion of the negative electrode tab 317 protrudes upward from the electrode assembly 312.

The cap assembly 320 includes a cap plate 340, an insulating plate 350, a terminal plate 360 and an electrode terminal 330. The cap assembly 320 is accommodated in an insulating case 370 and coupled with the upper opening 310a of the can 310 so as to seal the can 310.

Referring to FIG. 13a and FIG. 13b, the cap plate 340 may comprise a metal plate with a size and a shape that corresponds to those of the upper opening 310a of the can 310. The cap plate 340 is formed at the center thereof with a first terminal hole 341 having a predetermined size and the electrode terminal 330 is inserted into the first terminal hole 341. A gasket tube 346 is provided in the fourth terminal hole 341 to insulate the electrode terminal 330 from the cap plate 340.

A first resting recess 344 is formed on the lower surface of the cap plate 340. The first resting recess 344 includes the fourth terminal hole 341 and has a size corresponding to the size of the insulating plate 350. In particular, the first resting recess 344 includes the fourth terminal hole 341, is substantially the same size as the insulating plate 350, and is formed on the lower surface of the cap plate 340 such that the insulating plate 350 may rest in the first resting recess 344. The first resting recess 344 may be formed by recessing the lower surface of the cap plate 240.

The depth of the first resting recess 344 is selected by taking a contact surface between the cap plate 340 and the insulating plate 350 into consideration. For example, the first resting recess 344 may be in a range of about 0.1 mm to about 0.5 mm deep. If the first resting recess 344 is too shallow, the first resting recess 344 cannot secure the insulating plate 350. In addition, if the first resting recess 344 is too large, the strength of the cap plate 340 may be weakened.

The electrolyte injection hole 342 is formed at the other side of the cap plate 340 with a predetermined size. After the cap assembly 320 has been coupled with the upper opening 310a of the can 310, the electrolyte is injected into the can 310 through the electrolyte injection hole 342. Then, the electrolyte injection hole 342 is sealed with a plug 343.

Referring to FIG. 14a and FIG. 14b, the insulating plate 350 may comprise substantially the same insulating material as the gasket and is coupled with the lower surface of the cap plate 340. The insulating plate 350 includes a second terminal hole 351 and a second resting recess 352.

The fifth terminal hole 351 is aligned corresponding to the fourth terminal hole 341 of the cap plate 340 when the insulating plate 350 is coupled with the cap plate 340 such that the electrode terminal 330 may be inserted into the fifth terminal hole 351 through the first terminal hole 341.

The second resting recess 352 is formed on the lower surface of the insulating plate 350 with a size and a shape that corresponds to the terminal plate 360. The second resting recess 352 may have a depth less than the thickness of the terminal plate 360.

The terminal plate 360 may comprise a plate-shaped Ni alloy, but is not limited thereto. The terminal plate 36 rests in the second resting recess 352 formed on the lower surface of the insulating plate 350. Thus, the terminal plate 360 is coupled with the insulating plate 350 and moves together with the insulating plate 350. The terminal plate 360 is formed with a third terminal hole 361, which is aligned corresponding to the fourth terminal hole 341 of the cap plate 340 and into which the electrode terminal 330 is inserted. The terminal plate 360 is coupled with the electrode terminal 330 while being electrically insulated from the cap plate 340 by means of the insulating plate 350.

The electrode terminal 330 is inserted into the first, second and third terminal holes 341, 351 and 361 formed in the cap plate 340, the insulating plate 350 and the terminal plate 360, respectively. In addition, the electrode terminal 330 is coupled with the negative electrode tab 317 of the electrode assembly 312 through the terminal plate 360. When the electrode terminal 330 is inserted into the fourth terminal hole 341 of the cap plate 340, the electrode terminal 330 is electrically insulated from the cap plate 340 by means of the gasket tube 346. It is also possible to allow the electrode terminal 330 to be coupled with the positive electrode tab 316 depending on the type of the electrode assembly 312.

Figure 15:
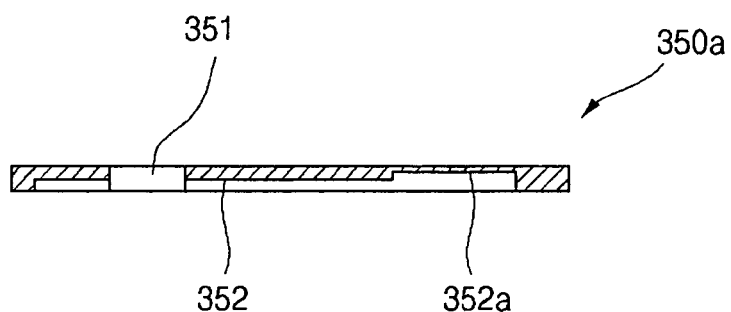
FIG. 15 is a sectional view of an insulating plate according to another exemplary embodiment of the present invention.
Figure 16:
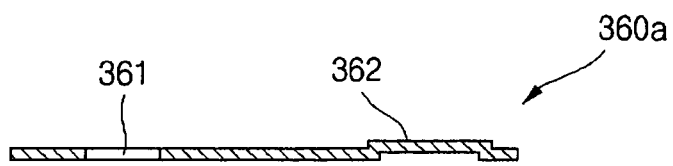
FIG. 16 is a sectional view of a terminal plate according to another exemplary embodiment of the present invention.

FIG. 15 is a sectional view of an insulating plate according to still another exemplary embodiment of the present invention and FIG. 16 is a sectional view of a terminal plate according to another exemplary embodiment of the present invention.

Referring to FIG. 15, the insulating plate 350a includes a first fixing groove 352 having a predetermined size and being formed at a predetermined portion of the second resting recess 352. The first fixing groove 352a may be aligned opposite the second terminal hole 351. The fixing groove 352a may be formed with various shapes, such as a square shape, a circular shape, or a rectangular shape, but is not limited thereto.

Referring to FIG. 16, the terminal plate 360a includes an anti-rotation protrusion 362 at its upper surface. The anti-rotation protrusion 362 corresponds to the first fixing groove 352a formed on the lower surface of the insulating plate 350a. The anti-rotation protrusion 362 is coupled with the fixing groove 352a, thereby preventing the terminal plate 360a from rotating relative to the insulating plate 350a.

Accordingly, the insulating plate 350a and the terminal plate 360a may be prevented from rotating relative to the cap plate 340 by means of the first fixing groove 352a and the anti-rotation protrusion 362.

Figure 17:
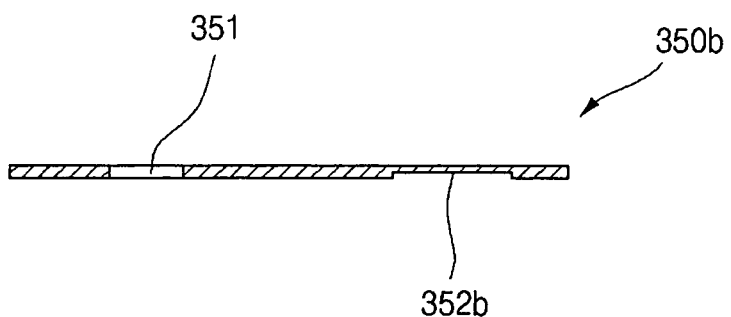
FIG. 17 is a sectional view of an insulating plate according to another exemplary embodiment of the present invention.

FIG. 17 is a sectional view of an insulating plate according to another exemplary embodiment of the present invention.

Referring to FIG. 17, the insulating plate 350b includes a second fixing groove 352b on its lower surface without forming a separate resting recess. The second fixing groove 352b is coupled with the anti-rotation protrusion 362 formed on the upper surface of the terminal plate 360a shown in FIG. 16. Accordingly, the terminal plate 360a is coupled with the insulating plate 350b rested in the first resting recess 344 of the cap plate 340 so that the terminal plate 360a may be prevented from rotating relative to the cap plate 340.

Hereinafter, the operation of the cap assembly included in the lithium rechargeable battery according to another exemplary embodiment of the present invention will be described.

Figure 18A:
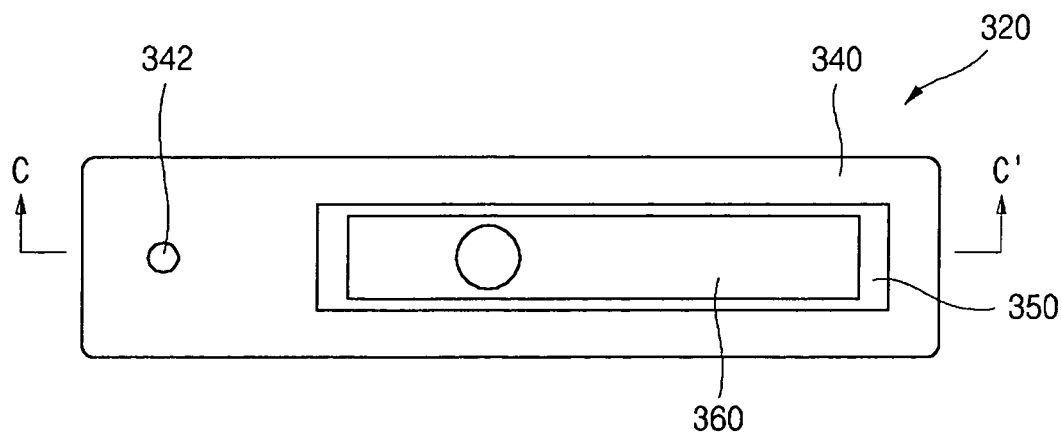
Figure 18B:
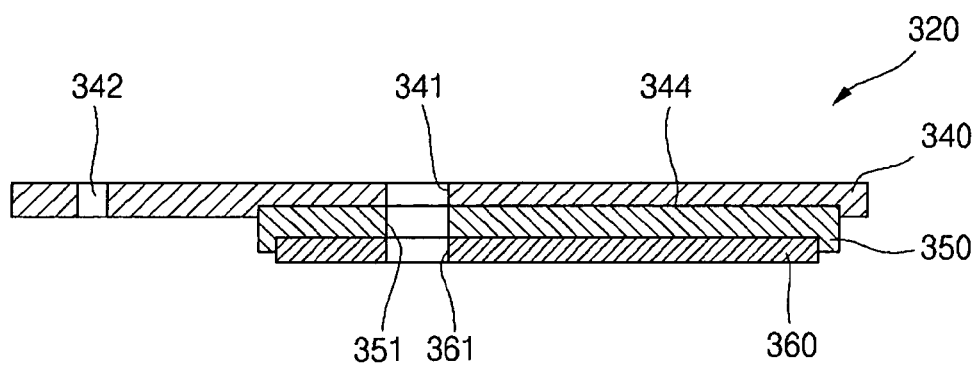

FIG. 18a is a bottom view of the cap assembly including the cap plate shown in FIG. 13a and the insulating plate shown in FIG. 14a, and FIG. 18b is a sectional view taken along line C-C' shown in FIG. 18a.

Referring to FIG. 18a and FIG. 18b, the cap plate 340, the insulating plate 350 and the terminal plate 360 of the cap assembly 320 are stacked such that centers of the fourth, fifth and sixth terminal holes 341, 351 and 361 align with each other. The electrode terminal 330 is then inserted into the fourth, fifth and sixth terminal holes 341, 351 and 361. The insulating plate 350 rests in the first resting recess 344 formed on the lower surface of the cap plate 340. In addition, the terminal plate 360 rests in the second resting recess 352 formed on the lower surface of the insulating plate 350.

The electrode terminal 330 is inserted into the fourth terminal hole 341 of the cap plate 340 stacked as shown in FIG. 18a while being rotated by predetermined external force applied thereto. The electrode terminal 330 passing through the fourth terminal hole 341 sequentially passes through the fifth terminal hole 351 of the insulating plate 350 and the is sixth terminal hole 361 of the terminal plate 360. At this time, since inner diameters of the fifth and sixth terminal holes 351 and 361 formed in the insulating plate 350 and the terminal plate 360, respectively, are substantially the same as or slightly larger than an outer diameter of the electrode terminal 330, friction may occur between the electrode terminal 330 and fifth and sixth terminal holes 351 and 361 of the insulating plate 350 and the terminal plate 360 when the electrode terminal 300 is inserted into the fifth and sixth terminal holes 351 and 361 of the insulating plate 350 and the terminal plate 360. However, since the insulating plate 350 rests in the first resting recess 344 of the cap plate 340 and the terminal plate 360 rests in the second resting recess 352 of the insulating plate 350, the insulating plate 350 and the terminal plate 360 are prevented from rotating.

In addition, the height of the cap assembly 320 may decrease because the insulating plate and the terminal plate may rest in the cap plate. Accordingly, the internal volume of the can may increase if the cap assembly is assembled with the can, so that capacity of the rechargeable battery can be increased.

Figure 19:
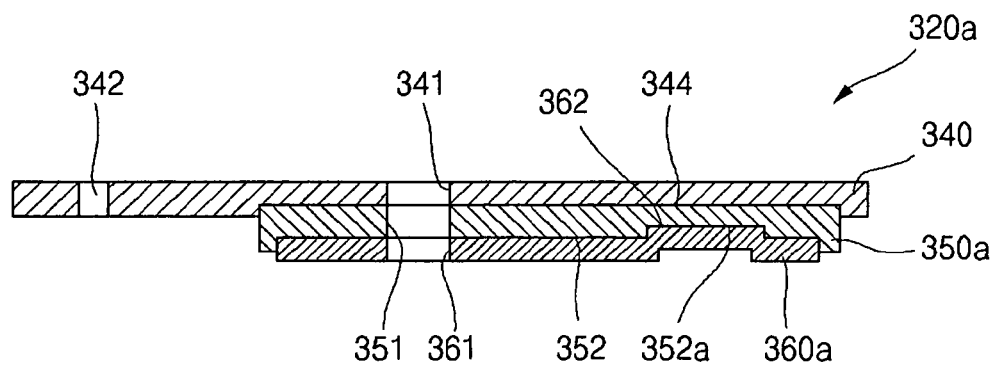
FIG. 19 is a sectional view of a cap assembly including a cap plate shown in FIG. 13a, an insulating plate shown in FIG. 15 and a terminal plate shown in FIG. 16.

FIG. 19 is a sectional view of the cap assembly including the cap plate shown in FIG. 13a, the insulating plate shown in FIG. 15, and the terminal plate shown in FIG. 16.

Referring to FIG. 19, the cap plate 340, the insulating plate 350a and the terminal plate 360a of the cap assembly 320a are stacked such that centers of the first, second and third terminal holes 341, 351 and 361 match each other and the electrode terminal 330 is inserted into the first, second and third terminal holes 341, 351 and 361. The insulating plate 350a rests in the first resting recess 344 formed on the lower surface of the cap plate 340. In addition, the terminal plate 360a rests in the second resting recess 352 formed on the lower surface of the insulating plate 350a. The first fixing groove 352a is formed in the second resting recess 352 of the insulating plate 350a and the anti-rotation protrusion 362 formed on the upper surface of the terminal plate 360a is inserted into the first fixing groove 352a. Therefore, the insulating plate 350a and the terminal plate 360a may not rotate relative to the cap plate 340 when the electrode terminal 330 is inserted into the first, second and third terminal holes 341, 351 and 361.

Figure 20:
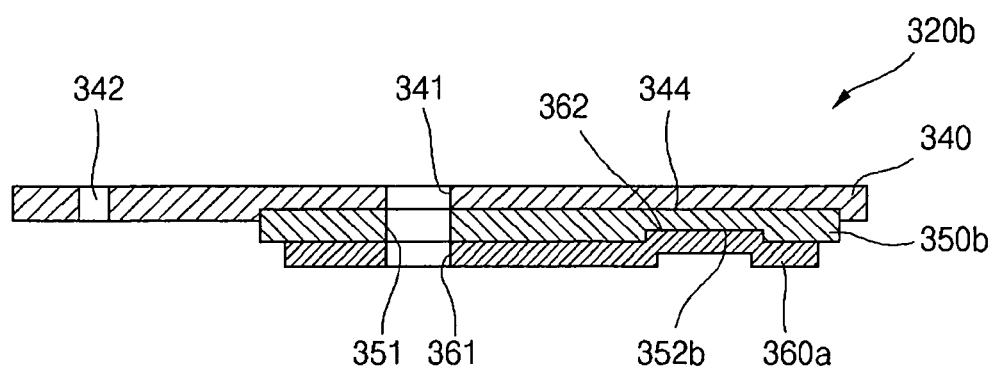
FIG. 20 is a sectional view of a cap assembly including a cap plate shown in FIG. 13a, an insulating plate shown in FIG. 17 and a terminal plate shown in FIG. 16.

FIG. 20 is a sectional view of the cap assembly including the cap plate shown in FIG. 13a, the insulating plate shown in FIG. 17 and the terminal plate shown in FIG. 16.

Referring to FIG. 20, the cap plate 340, the insulating plate 350b and the terminal plate 360a of the cap assembly 320b are stacked such that centers of the first, second and third terminal holes 341, 351 and 361 match each other and the electrode terminal 330 is inserted into the first, second and third terminal holes 341, 351 and 361. The insulating plate 350b rests in the first resting recess 344 formed on the lower surface of the cap plate 340. In addition, the terminal plate 360a rests on the lower surface of the insulating plate 350a. The anti-rotation protrusion 362 formed on the upper surface of the terminal plate 360a is inserted into the second fixing groove 352b formed on the lower surface of the insulating plate 350b. Therefore, the insulating plate 350b and the terminal plate 360a may not rotate relative to the cap plate 340 when the electrode terminal 330 is inserted into the first, second and third terminal holes 341, 351 and 361.

As described above, according to the rechargeable battery of the present invention, when fabricating the cap assembly by inserting the electrode terminal into the cap plate, the insulating plate and the terminal plate, the terminal plate can be prevented from rotating relative to the cap plate.

In addition, according to the present invention, the lower recess of the safety vent is integrally formed with the anti-rotation groove, so it is not necessary to match the upper recess of the safety vent with the lower recess of the safety vent, thereby facilitating and improving the fabrication process for the safety vent. In addition, the safety vent may be prevented from being deformed so that the safety and reliability of the rechargeable battery can be improved.

Furthermore, according to the present invention, when the lead plate is welded to the electrode terminal after the cap assembly has been assembled, the terminal plate may be prevented from rotating even if the electrode terminal rotates, thereby preventing deformation of the terminal plate.

In addition, according to the present invention, it is not necessary to inversely rotate the insulating plate and the terminal plate because the insulating plate and the terminal plate may not rotate when the electrode terminal is inserted therein, so deformation of the terminal plate can be prevented.

According to the present invention, the height of the cap assembly may be shortened because the insulating plate and the terminal plate may rest in the cap plate. Accordingly, an interval volume of the can may increase if the cap assembly is assembled with the can, so that capacity of the rechargeable battery can be increased.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A battery, comprising:
an electrode assembly including a first electrode, a second electrode, and a separator;
a case housing the electrode assembly and an electrolyte; and
a cap assembly disposed in an opening of the case and including a cap plate, an insulating plate disposed under the cap plate, a terminal plate disposed under the insulating plate, and an electrode terminal,
wherein the cap plate includes a first portion having a first thickness, and a second portion having a second thickness that is less than the first thickness, the second portion including a first recess formed in its lower surface, the first recess having opposing sidewalls,
wherein the insulating plate comprises an upper surface contacting the second portion of the cap plate, the upper surface of the insulating plate comprising a protrusion portion that extends toward the cap plate,
wherein the entire protrusion portion of the upper surface of the insulating plate is disposed in the first recess, between the opposing sidewalls,
wherein the insulating plate directly contacts at least one of the sidewalls, and
wherein the distance between the opposing sidewalls of the first recess is greater than or equal to the length of the insulating plate.

2. The battery of claim 1, wherein the insulating plate includes a second recess on its lower surface and in which the terminal plate is disposed.

3. The battery of claim 2,
wherein the insulating plate includes a first groove formed at a predetermined portion of the second recess, and
wherein the terminal plate includes an anti-rotation protrusion provided at an upper surface of the terminal plate such that the anti-rotation protrusion is coupled with the first groove.

4. The battery of claim 1, wherein the first recess is about 0.1 mm to about 0.5 mm deep.

5. The battery of claim 1, wherein the first recess is formed by recessing the lower surface of the cap plate.

6. The battery of claim 1,
wherein a second groove is formed at a predetermined portion of the insulating plate, and
wherein an anti-rotation protrusion is formed on an upper surface of the terminal plate such that the anti-rotation protrusion is coupled with the second groove.

7. The battery of claim 1,
wherein the cap plate comprises a first terminal hole in the first recess, the insulating plate comprises a second terminal hole, and the terminal plate comprises a third terminal hole, and
wherein the first, second, and third terminal holes are aligned with each other.

8. The battery of claim 7, wherein the electrode terminal is disposed in the first, second, and third terminal holes.

9. The battery of claim 7, wherein the electrode terminal is electrically insulated from the cap plate by a gasket tube.

10. The battery of claim 7, wherein the insulating plate comprises a second recess on its lower surface and in which the terminal plate is disposed.

11. The battery of claim 10,
wherein the insulating plate comprises a first groove formed at a predetermined portion of the second recess, and
wherein the terminal plate comprises an anti-rotation protrusion provided at an upper surface of the terminal plate such that the anti-rotation protrusion is coupled with the first groove.

12. The battery of claim 11, wherein the first groove is aligned opposite the second terminal hole.

13. The battery of claim 11, wherein a depth of the first groove from the lower surface of the insulating plate is greater than a depth of the second recess from the lower surface of the insulating plate.

14. The battery of claim 2, wherein the second recess of the insulating plate has a depth less than a thickness of the terminal plate.

15. The battery of claim 1, wherein the first recess of the cap plate has a depth less than a thickness of the insulating plate.

16. The battery of claim 2, wherein:
the second recess has opposing sidewalls; and
a distance between the opposing sidewalls of the second recess is greater than or equal to a length of the terminal plate.

17. The battery of claim 16, wherein a perimeter of the terminal plate is disposed entirely within a perimeter of the second recess.

18. The battery of claim 1, wherein a perimeter of the insulating plate is disposed entirely within a perimeter of the first recess.

19. A battery, comprising:
an electrode assembly including a first electrode, a second electrode, and a separator;
a case housing the electrode assembly and an electrolyte; and
a cap assembly disposed in an opening of the case and including a cap plate, an insulating plate disposed under the cap plate, a terminal plate disposed under the insulating plate, and an electrode terminal, wherein the cap plate includes a first recess formed in its lower surface, the first recess having opposing sidewalls, wherein the thickness of the cap plate between the sidewalls is less than the thickness of the remainder of the cap plate, wherein the insulating plate comprises an upper surface contacting the second portion of the cap plate, the upper surface comprising a protrusion portion that extends toward the cap plate, wherein the entire protrusion portion of the upper surface of the insulating plate is disposed in the first recess, between the opposing sidewalls, wherein the insulating plate directly contacts at least one of the sidewalls, and wherein the distance between the opposing sidewalls of the first recess is greater than or equal to the length of the insulating plate.

* * * * *